(No Model.)

C. FREMONT.
MACHINE FOR SAWING OR CUTTING METALS.

No. 501,135. Patented July 11, 1893.

Witnesses:
H. K. Boulter
O. L. Northup

Inventor:
Charles Fremont
by his attorney
Wm. E. Boulter

UNITED STATES PATENT OFFICE.

CHARLES FREMONT, OF PARIS, FRANCE.

MACHINE FOR SAWING OR CUTTING METALS.

SPECIFICATION forming part of Letters Patent No. 501,135, dated July 11, 1893.

Application filed March 6, 1893. Serial No. 464,828. (No model.)

*To all whom it may concern:*

Be it known that I, CHARLES FREMONT, a citizen of the Republic of France, residing at Paris, France, have invented certain new and useful Improvements in Machines for Sawing or Cutting Metals and the Like, of which the following is a full, clear, and exact description.

My invention has relation to machines for sawing or cutting metals or the like, and is designed more particularly for operating upon such articles as rails, tubes and angle-irons, and among the objects in view is to provide a simple, and efficient machine of the character described which is adapted to saw or cut various articles of metal or the like without the assistance of heat; also, to provide such a machine which is adapted to saw or cut the articles at various angles, and with the above and other objects in view, the invention consists in the novel construction, arrangement and combination of parts as hereinafter fully described, illustrated in the accompanying drawings, and pointed out in the appended claims.

Figure 1:
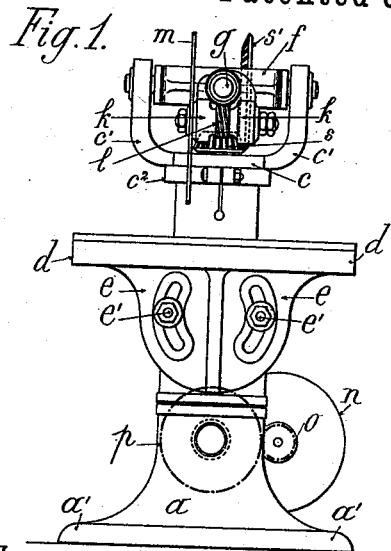
Figure 2:
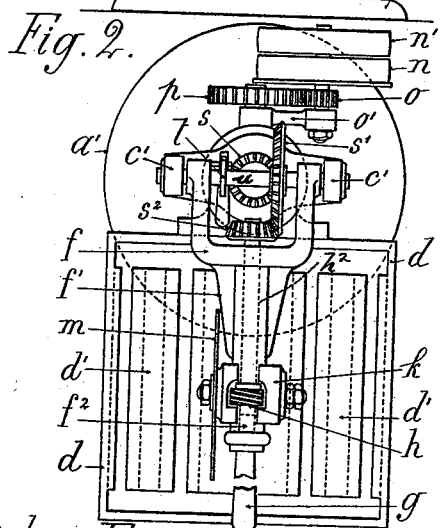
Figure 3:
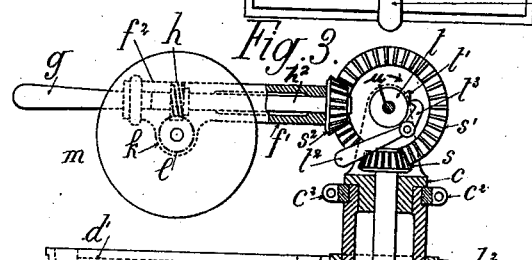

In the drawings:—Figure 1 is a front elevation of the improved machine; Fig. 2 a plan view thereof, and Fig. 3 a vertical section thereof showing the operating parts.

The machine comprises a frame consisting mainly of a hollow upright or support $a$, resting upon a circular foot or base $a'$. Upon this support $a$, is arranged a tube or sheath $b$, formed of two parts connected together by flanges and bolts $b^2$. Integral with this outer tube is a plate $b'$ upon which is a placed a disk or plate $e$ of corresponding shape which is integral with the work-table $d$. This work-table, whereon the bars, tubes or the like are placed for cutting is provided with grooves $d'$ in which guides of any suitable or ordinary shape or movable grippers may be adapted to slide for the purpose of adjusting and retaining the article in the desired position corresponding to the nature of the cut to be made. The disk $e$ forms an integral part of the table $d$, and is adapted to revolve upon the disk $b'$ of the casing $b$, about a horizontal axis. Bolts $e'$ fulfill the function of guides for this disk and enable the table $d$, to be firmly retained in position after the upper surface of the table has been suitably inclined in relation to the plane of the floor. The table $d$, may also revolve about the hollow upright $a$, owing to its connection with the casing $b$. A cap $c$, is fitted within the upper part of the upright and is connected with the same by a collar $c^2$. This cap $c$, may turn about the said upright in a horizontal plane and it serves as a support and guide for the movable parts employed to impart rotary motion to the saw. For this purpose it is provided with two ears or lugs $c'$ which support a forked lever $f$, near the end of which is pivoted the cutting saw $m$, and also the horizontal shaft upon which is keyed the bevel wheel $s'$ which transmits motion to the said saw $m$, whatever the position it occupies for the time being in relation to the vertical axis of the machine frame. The circular saw $m$, made preferably of cast steel and the cutting edge of which may be either toothed or not, is suspended or hinged below the forked lever $f$, a short distance from its end, which forms the operating handle $g$. A forked piece or yoke $k$, integral with or secured to the lever $f$, serves for supporting the saw-carrying shaft. Between the arms of the fork or yoke $k$, there is firmly secured to the shaft of the saw a worm wheel $l$, gearing with another worm-wheel $h$, arranged above it upon a shaft $h^2$ passing through the center of the hollow forked lever $f$, between the two portions $f'$ and $f^2$ of this lever. Upon the shaft of this worm wheel $h$, is keyed or rigidly attached a bevel pinion $s^2$ gearing with the bevel wheel $s'$ rigidly secured to the horizontal shaft $u$. The lower stationary cylindrical portion of the support $a$, through the medium of the piece $o'$ carries the gearing $o$, $p$, and also a fast and a loose pulley $n$, and $n'$. The gear wheels $o$, and $p$, convey the motion which they receive from the fast pulley to the bevel wheels $r$, $r'$, arranged within the upright $a$, and thereby turn the vertical shaft $i$, supported in the bearing $q$. This shaft $i$, carries round the bevel wheel $s$, arranged above the cap $c$, between the ears or lugs $c'$, and imparts rotary motion to the bevel wheels $s'$, $s^2$, and to the helical or worm wheels $h$, $l$, thereby causing the saw $m$, to rotate.

In order that the saw $m$, may turn in one direction only there is arranged upon the shaft $u$, a disk $t$, provided with a ratchet tooth $t'$, which operates conjointly with the pawl $t^3$, having a tail piece $t^2$ which acts as a counterweight. While the shaft $u$, turns in the direction of the arrow, the pawl $t^3$ slides upon the edge of the disk $t$, and upon the ratchet tooth $t'$ without interfering with the rotation of the said shaft. But as soon as the shaft $u$, turns in the direction opposite to that of the arrow, the pawl $t^3$ abuts against the ratchet tooth $t'$ and arrests the said shaft $u$, and consequently the saw $m$.

The machine operates as follows: The bars, tubes or the like to be cut or sawed are placed upon the table $d$, where they may be firmly retained by grippers located within grooves $d'$. The table is then inclined in relation to the horizontal line at the angle at which it is desired to cut the metal. The driving belt connected with the motor is then shifted from the loose pulley $n'$ on to the fast pulley $n$, whereby the toothed wheels $o$, and $p$, are set in motion together with the bevel wheels $r$, $r'$, $s$, $s'$, $s^2$. The wheel $s^2$ turns the shaft carrying the worm wheel $h$, so that this wheel and the worm wheel $l$, and thereby also the saw $m$, are rotated. The forked lever $f$, is then depressed by means of the handle $g$, to bring the saw down to the vertical plane of the intended cut through the tube or bar secured on the table $d$. By pressing down the cutting edge of the saw, the bar or tube is cut owing to the action of the rotating saw and the pressure exercised by means of the handle $g$ upon the said bar or tube.

The cap $c$, may be provided with a suitable index hand which will move along the hollow support $a$, which latter may be graduated and thus enable the various angles of inclination in relation to the vertical cutting plane of the saw to be exactly determined.

What I claim is—

1. In a machine for sawing or cutting metals, the combination with the vertically-arranged support, of a tube rotatably mounted upon said support, a table provided with segmental slots, and adjusting bolts passing through the said slots, and adjustably connecting the table with the tube.

2. In a machine for sawing or cutting metals, the combination with the vertically-arranged hollow support, of a cap carried at the upper end of the support and adapted to be horizontally adjusted, a rotatable shaft arranged within the support and passing through the cap, a lever pivotally connected with said cap and adapted to be moved vertically, a rotatable cutting saw carried by said lever, gearing between the said rotatable shaft and the cutting saw for rotating the latter, and a table carried by the support, as and for the purpose specified.

3. In a machine for sawing or cutting metals, the combination with a hollow upright, of a table supported thereby and adapted to be adjusted thereon as described, a cap revolubly mounted in the upright, a lever pivotally secured to the cap and adapted to be moved horizontally and vertically, a saw carried by said lever, a shaft $i$, mounted in the upright and passing through the cap, a drive shaft carried by the upright, intermeshing gear wheels carried by said shafts, a shaft $u$, carried by the cap, intermeshing gear wheels carried by said shafts $u$, and $i$, a shaft $h^2$ carried by the said lever, intermeshing gear wheels carried by said shafts $h^2$ and $u$, and a shaft carrying the saw mounted on the lever, and intermeshing worm wheels carried by the saw shaft and shaft $h^2$, for the purpose specified.

In testimony whereof I have hereto set my hand in the presence of the two subscribing witnesses.

CHARLES FREMONT.

Witnesses:
ALBERT MAULVAULT,
PAUL MAULVAULT.